UNITED STATES PATENT OFFICE.

AMÉ PICTET, OF GENEVA, SWITZERLAND, ASSIGNOR TO SOCIETY OF CHEMICAL INDUSTRY IN BASLE, OF BASEL, SWITZERLAND.

CONDENSATION PRODUCTS OF THE PAPAVERINE SERIES AND A PROCESS OF MAKING SAME.

1,176,597.  Specification of Letters Patent.  Patented Mar. 21, 1916.

No Drawing.  Application filed July 28, 1914.  Serial No. 853,737.

*To all whom it may concern:*

Be it known that I, AMÉ PICTET, professor, a citizen of the Swiss Republic, and resident of Geneva, Switzerland, have invented New Condensation Products of the Papaverine Series and a Process of Making Same, of which the following is a full, clear, and exact specification.

I have found that the hydroderivates of papaverine and particularly the tetrahydropapaverine react on the aldehydes of the aliphatic and aromatic series in such a manner, that the bivalent aldehyde radical enters between the nitrogen atom and a carbon atom of the veratryl residue water being split off. Thereby a second hydropyridin nucleus is closed and tetracyclic bases are obtained, having a constitution analogous to that of certain natural alkaloids as for instance the corydalisalkaloids.

The reaction seems to be represented by the following formulas:

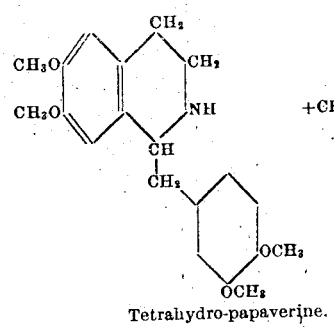
Tetrahydro-papaverine.

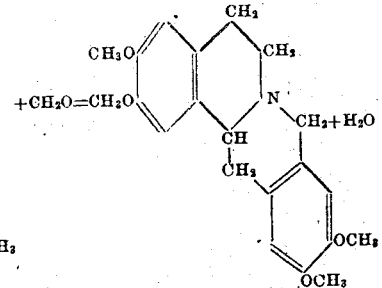
Methylen-tetrahydro-papaverine.

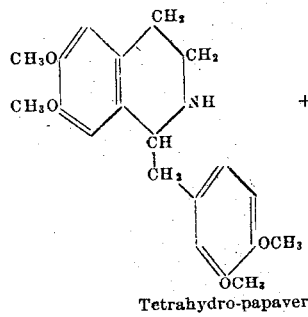
Tetrahydro-papaverine.

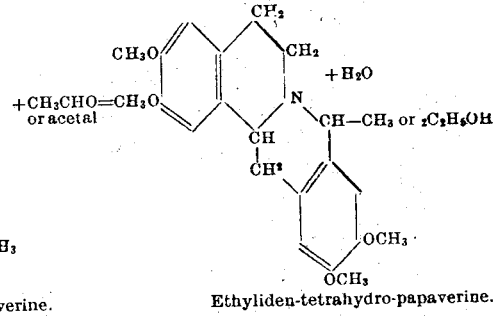
Ethyliden-tetrahydro-papaverine.

The nucleus substitution products of tetrahydropapaverine behave in analogous manner. In the most cases it is advantageous to substitute for the free aldehydes the corresponding acetals and to react with these latter on the hydropapaverines in presence of a mineral acid. Thereby the acetal is at first saponified by the acid, alcohol and aldehyde or aldehyde hydrate being formed, and the said aldehyde or aldehyde hydrate reacting consequently *in statu nascendi*.

Several of the new compounds thus obtained possess prominent physiological properties and are valuable medicines. In little doses, they act as narcotics and as means for raising the blood pressure and as means for strongly raising the *uterus tonus*. Their free bases are scarcely soluble in water, difficultly soluble in ether and cold benzene, pretty soluble in alcohol and form with hydrochloric acid hydrochlorids which are soluble in water.

The invention will be illustrated by the following examples:

Example I: 5 parts of tetrahydropapaverine-hydrochlorid are dissolved in 20 parts of pure dilute hydrochloric acid of a density of 1.06 and heated on a water bath in an apparatus provided with a reflux cooler. In the course of an hour, 10 parts of methylal are added by little portions. After cooling, the condensation product (methylentetrahydropapaverine) separates in the form of delicate colorless needles. The yielding is 90 per cent. of the theory. The free base, isolated from the hydrochlorid by sodium carbonate and recrystallized from dilute alcohol forms colorless laminæ melting at 157–158° C., easily soluble in alcohol and chloroform and difficultly soluble in ether and cold benzene. The hydrochlorid melts at 228 to 230° C.

Example II: 5 parts of tetrahydropapaverine hydrochlorid are dissolved in 60 parts of pure dilute hydrochloric acid of a density of 1.06 and the solution obtained is heated on the water bath. In the course of an hour, 6 parts of acetal are added by little portions and the reaction mass is heated for ½ hour and cooled down. The liquid stiffens to a mass of colorless needles constituting the ethylidentetrahydropapaverine hydrochlorid. The base liberated from this hydrochlorid by addition of sodium carbonate and recrystallized from alcohol forms colorless laminæ melting at 148° C.

Example III: 5 parts of aminotetrahydropapaverine hydrochlorid (prepared by reducing nitropapaverine with tin and hydrochloric acid) are condensed with acetal in the same conditions as specified in Example II. The amino-ethylidentetrahydropapaverine hydrochlorid is obtained in a good yielding and forms little colorless needles assuming after a short time a deep tint. The corresponding free base is instable.

Example IV: 5 parts of tetrahydropapaverine hydrochlorid are suspended in 70 parts of hydrochloric acid of a density of 1.06 and to this suspension are added on the water bath 5 parts of diethylbenzacetal

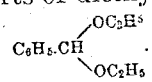

After 2 to 3 hours the mass is completely dissolved. The separation of the condensation product formed viz. of the benzylidentetrahydropapaverine corresponding to the formula

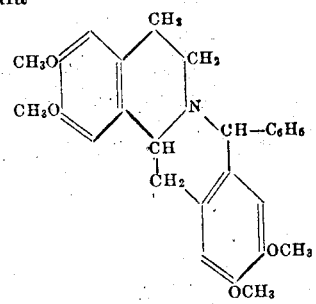

is effected as in Examples I and II.

The free base melts at 260 to 262° C. and the corresponding hydrochlorid melts at 304–306° C. with decomposition.

What I claim is:

1. The described process for the manufacture of new condensation products of the papaverine series consisting in reacting with aldehydes or hydropapaverines.

2. The described process for the manufacture of new condensation products of the papaverine series, consisting in reacting with aldehydes on hydropapaverines in the presence of mineral acids.

3. The described process for the manufacture of new condensation products of the papaverine series, consisting in reacting with aldehydes on tetrahydropapaverines in the presence of mineral acids.

4. As new products the papaverine derivatives resulting from the condensation of hydropapaverine with aldehydes in the presence of mineral acids, the said products being in the form of their free bases scarcely soluble in water, difficultly soluble in ether and cold benzene, pretty soluble in alcohol and forming with hydrochloric acid hydrochlorids which are soluble in water.

5. As a new article of manufacture the methylentetrahydropapaverine, which constitutes in the form of its free base, colorless crystals melting at 157 to 158° C., easily soluble in alcohol and chloroform and difficultly soluble in ether and cold benzene, while its hydrochlorid melts at 228 to 230° C.

In witness whereof I have hereunto signed my name this 16th day of July, 1914, in the presence of two subscribing witnesses.

AMÉ PICTET.

Witnesses:
  Louis H. Municy,
  E. Villiers.